US009703850B2

(12) United States Patent
Bhide et al.

(10) Patent No.: US 9,703,850 B2
(45) Date of Patent: Jul. 11, 2017

(54) EXTRACTING, TRANSFORMING, AND LOADING (ETL) JOB CREATION USING BUSINESS TERM STAGE

(71) Applicant: International Business Machines Corporation, Armonk, NY (US)

(72) Inventors: Manish A. Bhide, Hyderabad (IN); Srinivas K. Mittapalli, Hyderabad (IN); Sriram K. Padmanabhan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 14/191,838

(22) Filed: Feb. 27, 2014

(65) Prior Publication Data

US 2015/0242477 A1 Aug. 27, 2015

(51) Int. Cl.
*G06F 17/30* (2006.01)

(52) U.S. Cl.
CPC .. *G06F 17/30563* (2013.01); *G06F 17/30592* (2013.01); *G06F 17/30569* (2013.01); *G06F 17/30595* (2013.01)

(58) Field of Classification Search
CPC ......... G06F 17/30562; G06F 17/30592; G06F 17/30563; G06F 17/30303; G06F 17/30864; G06F 17/30557; G06F 17/30424; G06F 17/30477; G06F 17/30598; G06F 17/30705; G06F 17/30917; G06F 17/2264; G06F 17/30294; G06F 17/30572; G06F 17/30616; G06F 11/203; G06F 17/30; G06F 17/30194; G06F 17/30318; G06F 17/30525; G06F 17/30545; G06F 17/30595
See application file for complete search history.

(56) References Cited

U.S. PATENT DOCUMENTS

2010/0145921 A1* 6/2010 Stanley ............ G06F 17/30575 707/706
2011/0055147 A1 3/2011 Joerg et al.
2013/0054627 A1* 2/2013 Rausch .................... G06F 8/38 707/758
2013/0117217 A1 5/2013 Bhide et al.
2013/0124454 A1 5/2013 Bhide et al.
(Continued)

FOREIGN PATENT DOCUMENTS

WO 2007070631 A2 6/2007

OTHER PUBLICATIONS

Prasad, Ramya H. and Balaji, Rishi S., “Integrate enterprise metadata with IBM InfoSphere and Cognos”, IBM, developerWorks®, provided in search report dated Aug. 14, 2013, printed [Nov. 26, 2013], <: http://www.ibm.com/developerworks/data/tutorials/dm-1007infospherecognos/>.
(Continued)

*Primary Examiner* — Shahid Alam
*Assistant Examiner* — Andalib Lodhi
(74) *Attorney, Agent, or Firm* — Michael O’Keefe

(57) ABSTRACT

A computer determines a business glossary, wherein the business glossary includes one or more business terms that correspond to one or more assets. The computer receives a request to create an ETL job associated with a business term. The computer creates an ETL job for the business term, wherein the ETL job includes a business glossary stage.

17 Claims, 4 Drawing Sheets

START
CREATE BUSINESS GLOSSARY — 302
CREATE AN ETL JOB INCLUDING A BUSINESS GLOSSARY STAGE — 304
RECEIVE JOB REQUEST TO RUN ETL JOB — 306
DETERMINE DATABASES ASSOCIATED WITH BUSINESS TERM — 308
STORE INFORMATION — 310
END

(56) References Cited

U.S. PATENT DOCUMENTS

2015/0081353 A1* 3/2015 Schuster .............. G06Q 10/063 705/7.11
2015/0100331 A1* 4/2015 Roychowdhury ..... G06Q 10/10 705/2
2015/0220572 A1* 8/2015 Svarovsky ........ G06F 17/30294 707/603

OTHER PUBLICATIONS

"Introduction to IBM Information Server FastTrack", ETL-Tools. Info, Business Intelligence—Data warehousing—ETL, (c) 2006-2013 ETL-Toools.Info, All Rights Reserved, provided in search report dated Aug. 14, 2013, printed [Nov. 26, 2013], <http://etl-tools.info/infosphere-datastage-ee/fasttrack.htm>.

* cited by examiner

EXTRACTING, TRANSFORMING, AND LOADING (ETL) JOB CREATION USING BUSINESS TERM STAGE

FIELD OF THE INVENTION

The present invention relates generally to ETL job creation, and more particularly to ETL job creation utilizing a business glossary stage.

BACKGROUND

Utilizing ETL job creation within a business setup allows for a simple and efficient way of updating information across many computers. Currently, job creation involves creation of five stages: the database stage, the join stage, the aggregate stage, the filter stage, and the final database stage. If a job needs to be updated or a new database is desired to be added, the job is typically recreated to include the update or new database. This recreation process can require a considerable amount of time and effort. ETL tools are typically used for reading data from one or more sources, transforming the data and then loading it into the target. The sources may include a variety of information repositories such as databases, files, or information stored on the cloud. Currently, job creation involves the creation of stages such as: a database stage, a join stage, an aggregate stage, a filter stage, and a database stage. The data is eventually loaded into a target repository such as a database or a file.

SUMMARY

Embodiments of the present invention provide a system, method, and program product to create an ETL job utilizing a business glossary stage. A computer determines a business glossary, wherein the business glossary includes one or more business terms that correspond to one or more assets. The computer receives a request to create an ETL job associated with a business term. The computer creates an ETL job for the business term, wherein the ETL job includes a business glossary stage.

DETAILED DESCRIPTION

Figure 1:
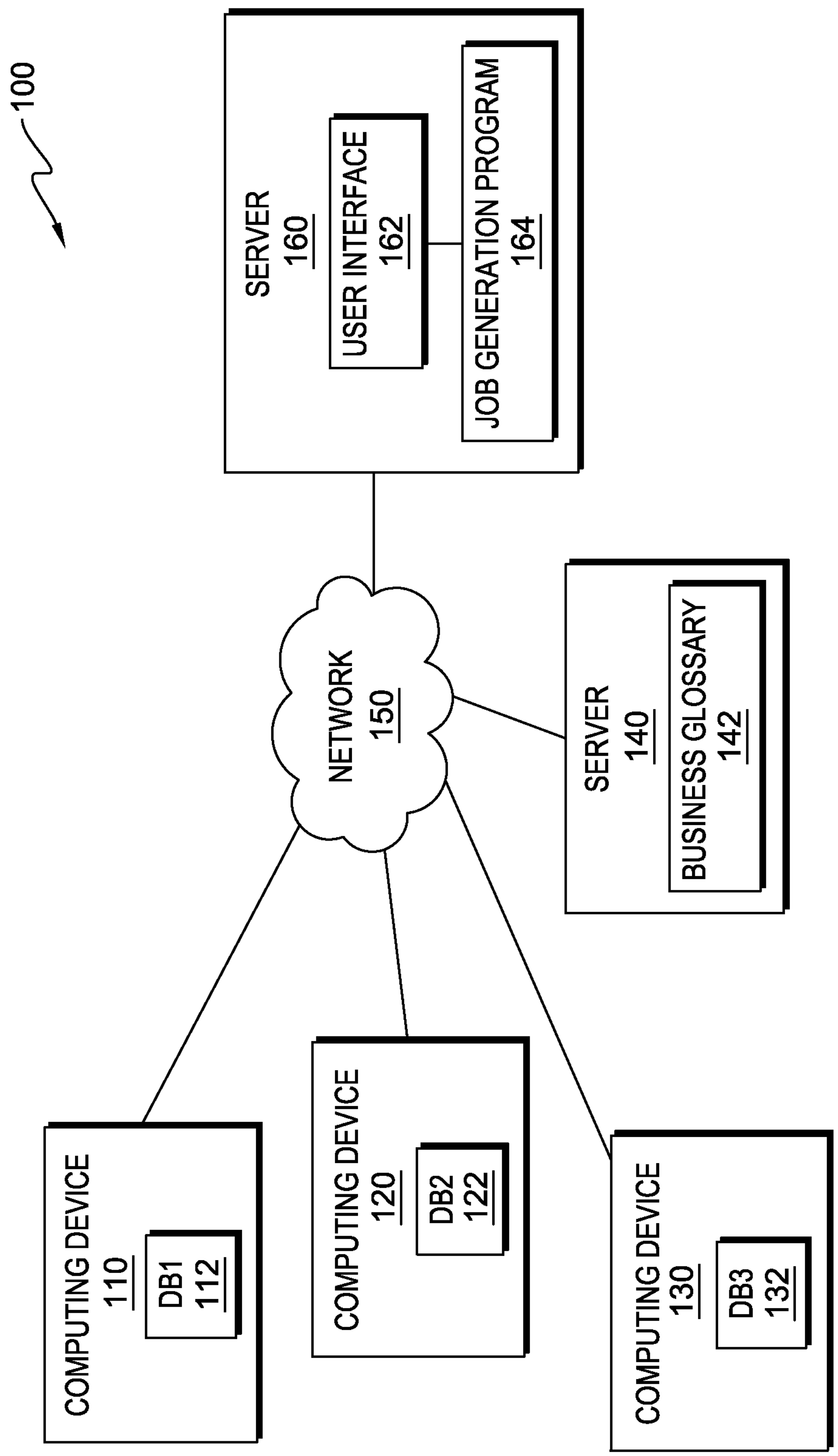
FIG. 1 is a functional block diagram illustrating the job generation system, in accordance with an embodiment of the present invention.

As will be appreciated by one skilled in the art, aspects of the present invention may be embodied as a system, method, or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the accompanying Figures.

FIG. 1 illustrates job generating system 100, in accordance with an embodiment of the present invention. In an exemplary embodiment, job generating system 100 includes computing device 110, computing device 120, computing device 130, server 140 and server 160, all interconnected via network 150.

In the exemplary embodiment, network 150 is the Internet, representing a worldwide collection of networks and gateways to support communications between devices connected to the Internet. Network 150 may include, for example, wired, wireless, or fiber optic connections. In other embodiments, network 150 may be implemented as an intranet, a local area network (LAN), or a wide area network (WAN). In general, network 150 can be any combination of connections and protocols that will support communications between computing device 110, computing device 120, computing device 130, server 140 and server 160.

In the exemplary embodiment, computing device 110, computing device 120, and computing device 130 include database 1 112 (DB1), database 2 122 (DB2) and database 3 132 (DB3), respectively. In the exemplary embodiment, DB1 112, DB2 122, and DB3 132 contain data or information utilized by job generation program 164 when running a job. For example, DB1 112 may contain customer biographical information, while DB2 122 may contain customer transactional information, and DB3 132 may contain customer rating information. A job pertaining to a "high valued customer" may require information to be retrieved and aggregated from all three databases in order to create a table of high valued customers.

In the exemplary embodiment, server 140 and server 160 may be laptop computers, tablet computers, notebook computers, personal computers (PC), desktop computers, personal digital assistants (PDA), smart phones, or any programmable electronic device capable of communication with computing device 110, computing device 120, and computing device 130, via network 150. Server 140 and 160 may include internal and external hardware components, as depicted and described in further detail with respect to FIG. 5.

In the exemplary embodiment, server 140 includes business glossary 142. Business glossary 142 is data that defines a correlation between certain business terms and certain assets, such as databases or files. For example, business glossary 142 may include business terms or phrases such as "high value customer", which may be correlated or mapped to assets such as DB1 112, which may include information describing customer transactions or spending information and DB2 122, which may include customer biographical information.

In the exemplary embodiment, server 160 includes user interface 162 and ETL job generation program 164. User interface 162 includes components to receive user input of server 160 and transmit input to job generation program 164. User interface 162 uses a combination of technologies, such as device drivers, to provide a platform to enable users to interact with job generation program 164.

In the exemplary embodiment, job generation program 164 is software capable of receiving and transmitting information to other computing devices, such as server 140, via network 150. Job generation program 164 is also capable of generating ETL jobs and also running an ETL job after creation. In the exemplary embodiment, an ETL job includes a business glossary stage, which takes as input a business glossary term that is defined in business glossary 142, an aggregate stage, a filter stage, and a final database stage. In addition, job generation program 164 is capable of communicating with server 140 in order to determine the appropriate assets, such as databases, that are correlated with the business term, which is associated with the business glossary stage of the ETL job. The stages of ETL jobs are discussed in greater detail with regard to FIGS. 2, 3 and 4.

Figure 2:
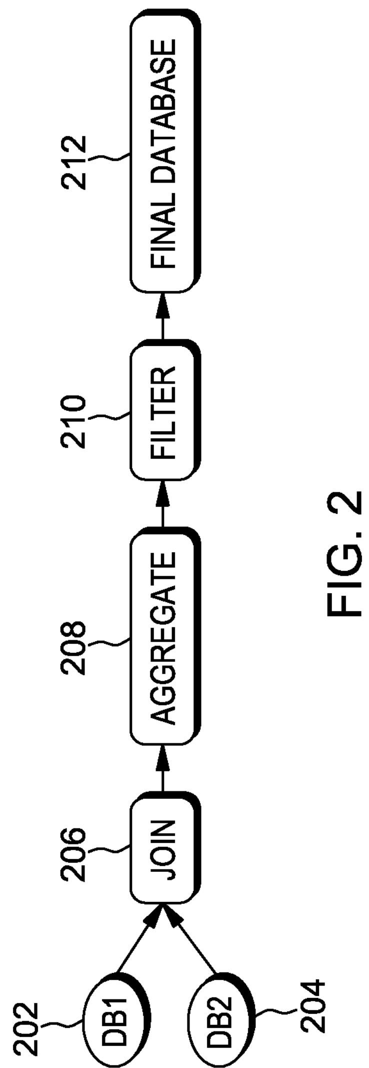
FIG. 2 is a block diagram illustrating the current ETL job process, in accordance with an embodiment of the present invention.

FIG. 2 is a block diagram illustrating the current process in creating a new ETL job. In the exemplary embodiment, the ETL job represented by FIG. 2 may be for a specific business term, such as "high valued customer". FIG. 2 depicts the different stages involved in ETL job creation. Currently, to create an ETL job, a programmer must determine which databases are associated with the business term using business glossary 142. In this depiction, the associated databases are DB1 202 and DB2 204. The job is created as depicted, with the databases being joined together at join stage 206. In the exemplary embodiment, joining combines or collects the information contained in both databases. For example, for an ETL job for the business term "high valued customer", DB1 may contain information concerning customer transaction information, such as total spending for that quarter, while DB2 204 may contain personal customer information, such as the name of the customer and address. At join stage 206, this information is combined. After joining the two databases together, the databases are aggregated together at aggregate stage 208. In the exemplary embodiment, aggregating the databases includes grouping the data together. For example, after joining DB1 202 containing customer transaction information and DB2 204 containing personal customer information, both the transaction information and personal customer information are aggregated together into a more seamless and formal manner, such a set of data, which may include several data entries. In other words, a single data entry may contain a customer ID number, biographical information, and customer information obtained from DB2 204, along with transactions affiliated with that customer ID number, and other transactional information obtained from DB1 202. Once the data is aggregated into a set of data, the data is filtered at filter stage 210. Filtering involves removing unwanted data or data entries from the entire aggregated data set. For example, after aggregating the information into a set of data, such as data entries, certain data entries may be filtered out based on certain requirements. For example, if a "high valued customer" is defined as a customer who has an associated total transaction amount totaling $10,000 or more, data entries which do not meet the requirements of a "high valued customer" may be filtered out. In this example, only customers with transaction amounts totaling over $10,000 are considered high valued customers. Customers whose transactions total does not meet or exceed the $10,000 minimum are filtered out of the dataset. Once the data set is filtered, the data set is stored in final database 212 in association with the business term; in this case, "high value customer", for future reference purposes. However, using this current form of job generation if, at a later time, an additional database was desired to be associated with the with the business term "high valued customer", the job would have to be completely reconstructed to include three databases prior to the join stage. Naturally, this may require a great deal of time and effort on the part of the programmer.

Figure 3:
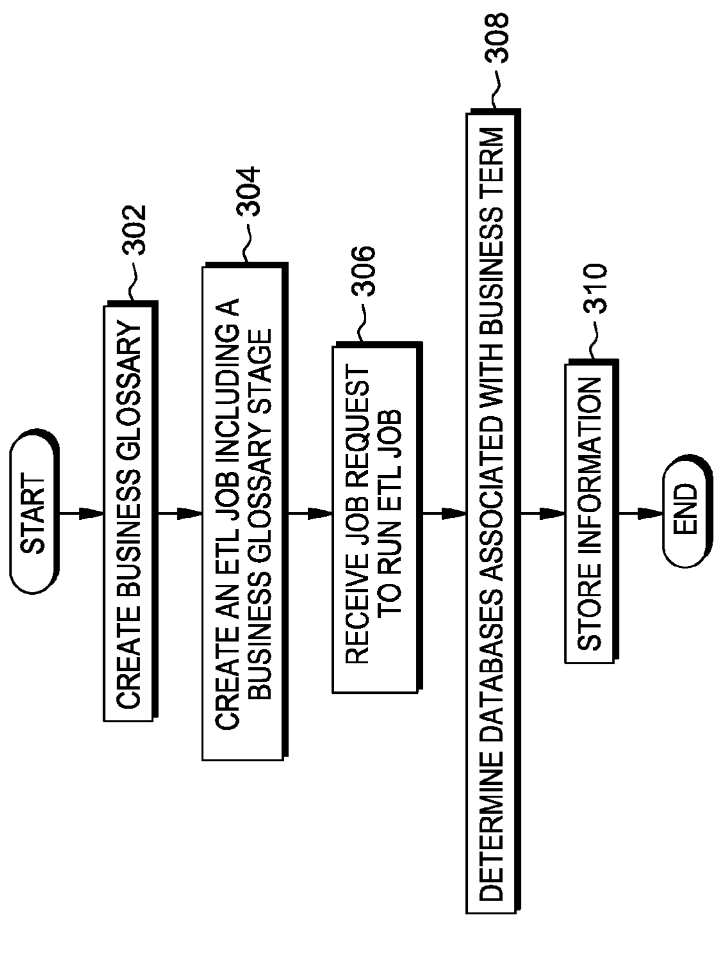
FIG. 3 is a flowchart depicting the operational steps of job generation program of FIG. 1 in generating a new ETL job utilizing a business term stage, in accordance with an embodiment of the present invention.

FIG. 3 is a flowchart, illustrating the operational steps of job generation program 164 in creating an ETL job associated with a certain business term, in accordance with an embodiment of the invention. In the exemplary embodiment, job generation program 164 creates business glossary 142 (step 302). In the exemplary embodiment, an ETL job developer may input business terms and their associated assets, such as databases, into job generation program 164 via user interface 162 in order to create business glossary 142. Business glossary 142 may then be stored on server 140 via network 150. In other embodiments, business glossary 142 may be created in a similar manner directly on server 140, or another computing device, and retrieved or accessed by job generation program 164 via network 150. In addition, business glossary 142 may be updated in a similar fashion as described above any time after formation. For example, if "high value customer" initially is associated with DB1 112 and DB2 122, a user or developer may update the databases associated with the business term to further include DB3 132. In addition, if the databases associated with the business term are updated, the business term may also be changed as well. Referring to the example above, if DB3 132 is a database containing retail customer information, a developer may utilize job generation program 164 to update the business term "high value customer" to instead be "high value retail customer". In the exemplary embodiment, updating the databases associated with a business term in business glossary 142 includes removing databases, adding databases, replacing databases, or altering the databases associated with a business term. In other embodiments, rather than updating the business term, job generation program 164 may suggest an alternate name to the user of server 160, via user interface 162, for the business term based on the databases associated with the business term.

Job generation program 164 creates an ETL job for a certain business term (step 304). In the exemplary embodiment, an ETL developer may input a set of specified criteria via user interface 162, which job generation program 164 utilizes in creating the ETL job. For example, an ETL developer may input or select specific stages desired to be present in the ETL job or other various types of job creation criteria. In the exemplary embodiment, job generation program 164 creates an ETL job similar to the one depicted in FIG. 2 except, job generation program 164 creates a business glossary stage in place of the database and join stages depicted in FIG. 2. Therefore, job generation program 164 creates an ETL job for a certain business term such as, for example, "high valued customer", which contains a business glossary stage, an aggregate stage, a filter stage, and a final database stage. Later on, when job generation program 164 runs the ETL job, at the business glossary stage, job generation program 164 references business glossary 142 in order to determine the assets/databases which are associated with the business term at that time. As stated above, business glossary 142 may be updated at any time after creation; therefore, the databases associated with a business term in business glossary 142 are not necessarily constant. In the exemplary embodiment, updating business glossary 142 may include associating a new asset with a business term, removing an association between an asset and a business term, replacing an asset associated with a business term with another asset, or otherwise altering a business term or an associated asset.

In other embodiments, job generation program 164 creates an ETL job similar to the one depicted in FIG. 2 except, job generation program 164 creates a business glossary stage in place of the final database stage, database 212, depicted in FIG. 2. In this embodiment, job generation program 164 creates an ETL job for a certain business term such as, for example, "high valued customer", that contains one or more database stages, such as a database 1 and database 2 stage, a join stage, an aggregate stage, a filter stage, and a business glossary stage. Later on, when the ETL job is run, job generation program 164 references business glossary stage 142 and determines the assets/databases associated with business term; in this case, "high valued customer".

Job generation program 164 then receives a request to run the created ETL job (step 306). In the exemplary embodiment, a request is an instruction to job generation program 164 to run the requested ETL job, with the request being input via user interface 162, or via a request received via network 150 from another computing device. For example, job generation program 164 may receive a request to run the created ETL job which, for example, may be associated with the business term "high valued customer". As stated above, in the exemplary embodiment, job generation program 164 receives the job request by way of input received via user interface 162, or via a request received via network 150. In response, job generation program 164 runs the requested ETL job.

Job generation program 164 performs the business glossary stage of the ETL job and determines which databases are associated with the business term (step 308). In the exemplary embodiment, the first stage of the ETL job is the business glossary stage in which, as described above, job generation program 164 references business glossary 142 in order to determine which databases are associated with the business glossary term associated with the ETL job. For example, if the ETL job is associated with the term "high valued customer", job generation program 164 may reference business glossary 142 and determine that DB1 112, which contains customer transaction information, such as total spending for that quarter, and DB2 122, which contains personal information about the customer, such as the customer's name and address, are detailed as associated with the business term "high valued customer". Once the databases are determined, job generation program 164 joins the databases, or in other words, combines or collects the information contained in the databases. Job generation program 164 then moves on to the aggregation stage and aggregates the information contained in the databases in a similar manner as described above. For example, once the databases are aggregated together, a single data entry for the business glossary term "high valued customer" may contain a customer ID number, biographical information, and customer information obtained from DB2, along with transactions affiliated with that customer ID number, and other transactional information obtained from DB1. Following the aggregation stage, job generation program 164 filters the data at the filter stage in a similar manner as described above.

Job generation program 164 then stores the filtered information in the final database stage (step 310). In the exemplary embodiment, the final database is a cloud storage system that stores data, tables, or any other additional information.

In other embodiments, where job generation program 164 creates a business glossary stage in place of the final database stage, job generation program 164 determines the assets/databases associated with the business term, and stores the filtered information in the determined assets/databases in association with the information in the determined assets/databases. For example, for the business term "high valued customer", job generation program 164 may join information from a first and a second asset, along with aggregating and filtering the information from the assets. Job generation program 164 then determines the asset(s) associated with the business term, and stores the filtered information in association with information from the determined asset(s) in a final database. Therefore, if job generation program 164 determined, by way of referencing the business glossary, that a "retail customer" database was associated with the business term "high valued customer", job generation program 164 stores the filtered information in association with information from the "retail customer" database in a final database. The final database may be the "customer database" or another database/asset.

Figure 4:
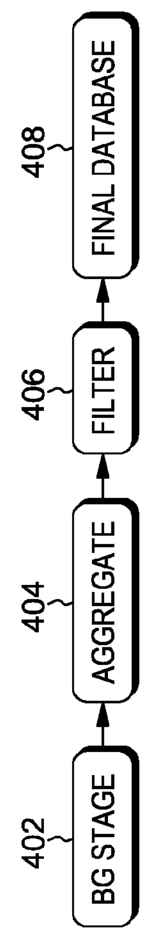
FIG. 4 is a block diagram illustrating an ETL job generated by job generation program of FIG. 1, in accordance with an embodiment of the present invention.

FIG. 4 is a block diagram illustrating an ETL job, which includes a business glossary stage. As depicted, the ETL job created by job generation program 164 includes business glossary (BG) stage 402, aggregate stage 404, filter stage 406, and final database stage 408. As previously stated, in the depicted ETL job, business glossary stage 402 is in place of the database and join stages depicted in FIG. 2. Within business glossary stage 402, job generation program 164 references business glossary 142 and determines the databases that correlate with the business term associated with the ETL job. By utilizing a business glossary stage, if an ETL developer desires to change assets or databases associated with a business term rather than recreating the ETL job, the ETL developer can alter the assets associated with the business term within business glossary 142. Therefore, when job generation program 164 references business glossary 142 during the business glossary stage, the correct assets will be joined and utilized by job generation program 164.

The foregoing description of various embodiments of the present invention has been presented for purposes of illustration and description. It is not intended to be exhaustive, or to limit the invention to the precise form disclosed. Many modifications and variations are possible. Such modifications and variations that may be apparent to a person skilled in the art of the invention, are intended to be included within the scope of the invention, as defined by the accompanying claims.

Figure 5:
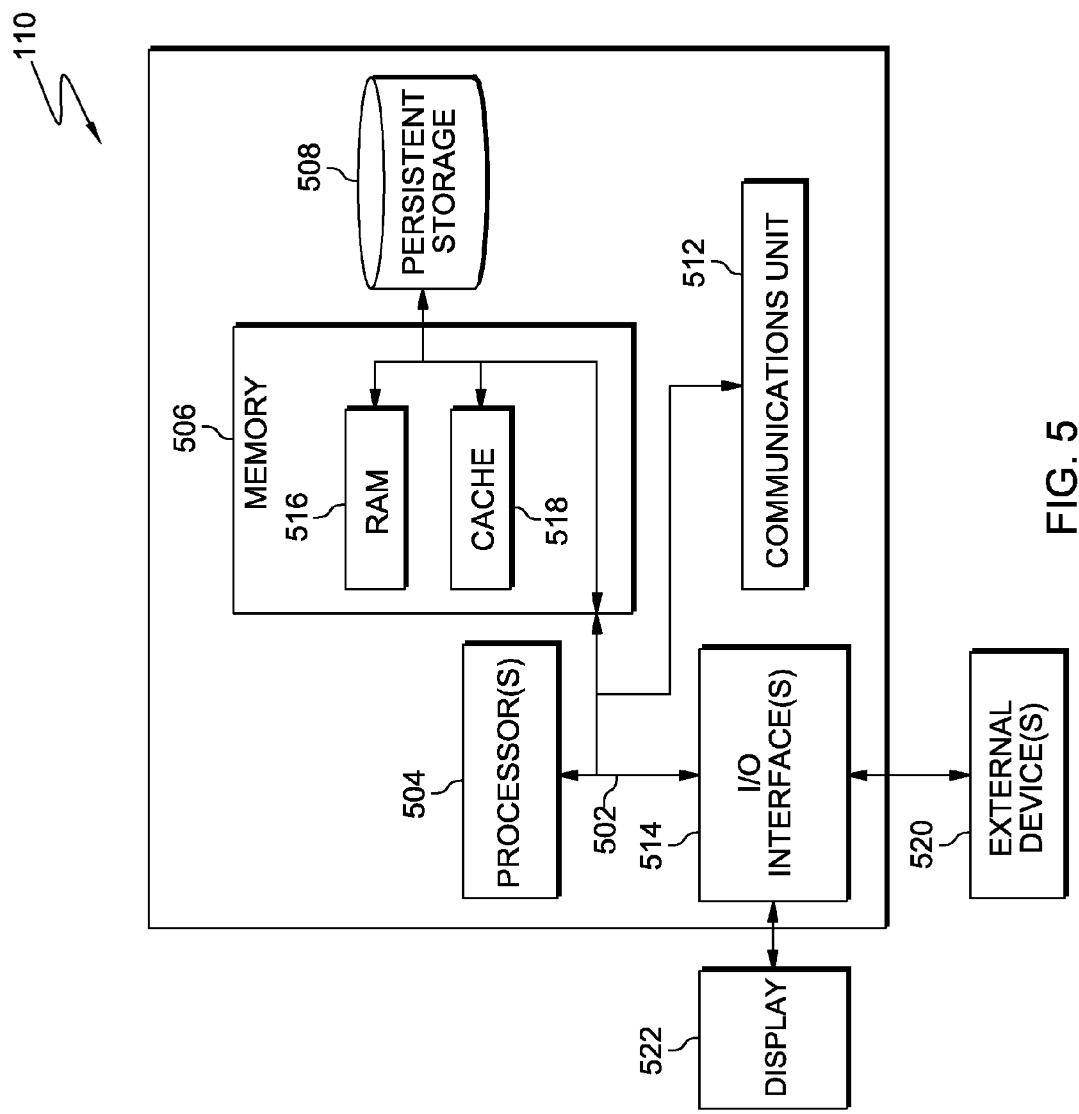
FIG. 5 is block diagram depicting the hardware components of the job generation program of FIG. 1, in accordance with an embodiment of the present invention.

FIG. 5 depicts a block diagram of respective components of computing device 110, computing device 120, computing device 130, server 140 and server 160 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 110, computing device 120, computing device 130, server 140 and server 160 include respective communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media.

The programs, job generation program 164 stored in server 160 and business glossary 142 stored in server 140, are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 512 may provide communications through the use of either or both physical and wireless communications links. The programs, job generation program 164 in server 160 and business glossary 142 in server 140, may be downloaded to persistent storage 508 through communications unit 512.

I/O interface(s) 514 allows for input and output of data with other devices that may be connected to server 140 and server 160. For example, I/O interface 512 may provide a connection to external devices 520 such as a keyboard, keypad, a touch screen, and/or some other suitable input device. External devices 520 can also include portable computer-readable storage media such as, for example, thumb drives, portable optical or magnetic disks, and memory cards. Software and data used to practice embodiments of the present invention, e.g., the program job generation 164 in server 160 and program business glossary 142 in server 140, can be stored on such portable computer-readable storage media, and can be loaded onto persistent storage 508 via I/O interface(s) 514. I/O interface(s) 514 can also connect to a display 522.

Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and, thus, the invention should not be limited to use solely in any specific application identified and/or implied by such nomenclature.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for extracting, transforming, and loading (ETL) job utilizing a business glossary stage, comprising the steps of:

a computing device determining a business glossary, wherein the business glossary comprises a business term that correspond to a first business term of a first asset, a second business term of the second asset, and a third business term of a third asset, wherein the first asset comprises customer transaction information, the second asset comprises customer personal information, and the third asset comprises customer rating information;

the computing device receiving a request from a user to create an ETL job associated with the business term; and the computing device creating an ETL job for the business term, wherein the ETL job comprises a business glossary stage, wherein the business glossary stage comprises correlating the business term to the first business term and to the second business term, renaming the first business term in the first asset to the business term, renaming the second business term in the second asset to the business term, combining the customer transaction information of the first asset and the customer personal information of the second asset into a single data entry of a final database, and filtering the final database to remove data entries which do not fulfill criteria of the ETL job, wherein the criteria comprises a minimum spend value for a fourth business term of the first asset;

repeating the ETL job correlating the business term to the third business term.

2. The method of claim 1, further comprising:

the computing device receiving a request from the user to run the ETL job; and the computing device performing the business glossary stage, wherein performing the business glossary stage comprises referencing the business glossary in order to determine one or more assets associated with the one or more business terms.

3. The method of claim 1, further comprising:

the computing device updating the business glossary such a fifth business term is associated with a sixth business term of the first asset, a seventh business term of the second asset and an eighth business term of the third asset.

4. The method of claim 1, further comprising:

the computing device receiving a second request to run the ETL job; and the computing device performing the business glossary stage, wherein performing the business glossary stage further comprises determining that the first business term of the first asset and the second business term of the second asset are associated with the business term, and joining at least a portion of information from the first asset and the second asset into the final database.

5. The method of claim 4, further comprising:

the computing device updating the business glossary, wherein updating the business glossary comprises updating the business term such that the business term is associated with the first business term of the first asset, the second business term of the second asset and the third business term of the third asset;

the computing device receiving a third request to run the ETL job; and the computing device performing the business glossary stage, wherein the business glossary stage further comprises determining that the first business term of the first asset, the second business term of the second asset, and the third business term of the third asset are associated with the business term, and joining at least a portion of information from the first asset, the second asset, and the third asset into the final database.

6. The method of claim 5, wherein updating the business glossary further comprises:

changing the business term based on the first business term of the first asset, the second business term of the second asset, and the third business term of the third asset.

7. A computer program product for extracting, transforming, and loading (ETL) job utilizing a business glossary stage comprising:

one or more computer-readable storage devices and program instructions stored on at least one of the one or more tangible storage devices, the program instructions comprising:

program instructions to determine a business glossary, wherein the business glossary comprises a business term that correspond to a first business term of a first asset, a second business term of the second, and a third business term of a third asset, wherein the first asset comprises customer transaction information, the second asset comprises customer personal information, and the third asset comprises customer rating information;

program instructions to receive a request from a user to create an ETL job associated with the business term; and, program instructions to create an ETL job for the business term, wherein the ETL job comprises a business glossary stage, wherein the business glossary stage comprises correlating the business term to the first business term and to the second business term, program instructions to rename the first business term in the first asset to the business term, program instructions to rename the second business term in the second asset to the business term, program instructions to combine the customer transaction information of the first asset and the customer personal information of the second asset into a single data entry of a final database, and program instructions to filter the final database to remove data entries which do not fulfill criteria of the ETL job, wherein the criteria comprises a minimum spend value for a fourth business term of the first asset;

program instructions to repeat the ETL job correlating the business term to the third business term.

8. The computer program product of claim 7, further comprising:

program instructions to receive a request from the user to run the ETL job; and program instructions to perform the business glossary stage, wherein the program instructions to perform the business glossary stage comprises program instructions to reference the business glossary in order to determine one or more assets associated with the one or more business terms.

9. The computer program product of claim 7, further comprising:

program instructions to update the business glossary such that a fifth business term is associated with a sixth business term of the first asset, a seventh business term of the second asset and an eighth business term of the third asset.

10. The computer program product of claim 7, further comprising:

program instructions to receive a second request to run the ETL job; and program instructions to perform the business glossary stage, wherein the program instructions to perform the business glossary stage further comprises program instructions to determine that the first business term of the first asset and the second business term of the second asset are associated with the business term, and program instructions to join at least a portion of information from the first asset and the second asset into the final database.

11. The computer program product of claim 10, further comprising:

program instructions to update the business glossary, wherein the program instructions to update the business glossary comprises program instructions to update the business term such that it is associated with the first business term of the first asset, the second business term of the second asset and the third business term of the third asset;

program instructions to receive a third request to run the ETL job; and program instructions to perform the business glossary stage, wherein the program instructions to perform the business glossary stage further comprises program instructions to determine that the first business term of the first asset, the second business term of the second asset, and the third business term of the third asset are associated with the business term, and program instructions to join at least a portion of information from the first asset, the second asset, and the third asset into the final database.

12. The computer program product of claim 11, wherein the program instructions to update the business glossary further comprises:

program instructions to change the business term based on the first business term of the first asset, the second business term of the second asset, and the third business term of the third asset.

13. A computer system for extracting, transforming, and loading (ETL) job utilizing a business glossary stage comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to determine a business glossary, wherein the business glossary comprises a business term that correspond to a first business term of a first asset, a second business term of the second, and a third business term of a third asset, wherein the first asset comprises customer transaction information, the second asset comprises customer personal information, and the third asset comprises customer rating information;

program instructions to receive a request from a user to create an ETL job associated with the business term; and program instructions to determine a business glossary, wherein the business glossary comprises a business term that correspond to a first business term of a first asset, a second business term of the second, and a third business term of a third asset, wherein the first asset comprises customer transaction information, the second asset comprises customer personal information, and the third asset comprises customer rating information;

program instructions to receive a request from a user to create an ETL job associated with the business term; and program instructions to create an ETL job for the business term, wherein the ETL job comprises a business glossary stage, wherein the business glossary stage comprises correlating the business term to the first asset business term and to the second business term, program instructions to rename the first business term in the first asset to the business term, program instructions to rename the second business term in the second asset to the business term, program instructions to combine the customer transaction information of the first asset and the customer personal information of the second asset into a single data entry of a final database, and program instructions to filter the final database to remove data entries which do not fulfill criteria of the ETL job, wherein the criteria comprises a minimum spend value for a fourth business term of the first asset;

program instructions to repeat the ETL job correlating the business term to the third business term.

14. The computer system of claim 13, further comprising:

program instructions to receive a request from the user to run the ETL job; and program instructions to perform the business glossary stage, wherein the program instructions to perform the business glossary stage comprises program instructions to reference the business glossary in order to determine one or more assets associated with the one or more business terms.

15. The computer system of claim 13, further comprising:

program instructions to update the business glossary such that a fifth business term is associated with a sixth business term of the first asset, a seventh business term of the second asset and an eighth business term of the third asset.

16. The computer system of claim 13, further comprising:

program instructions to receive a second request to run the ETL job; and program instructions to perform the business glossary stage, wherein the program instructions to perform the business glossary further comprises program instructions to determine that first business term of the first asset and the second business term of the second asset are associated with the business term, and program instructions to join at least a portion of information from the first asset and the second asset.

17. The computer system of claim 16, further comprising:

program instructions to update the business glossary, wherein the program instructions to update the business glossary comprises program instructions to update the business term such that it is associated with the first business term of the first asset, the second business term of the second asset and the third business term of the third asset;

program instructions to receive a third request to run the ETL job; and program instructions to perform the business glossary stage, wherein the program instructions to perform the business glossary stage further comprises program instructions to determine that the first business term of the first asset, the second business term of the second asset, and the third business term of the third asset are associated with the business term, and program instructions to join at least a portion of information from the first asset, the second asset, and the third asset into the final database.

* * * * *